Feb. 25, 1969

L. H. LORBER 3,429,702

PROCESS OF PRODUCING MULTICOLOR UTILIZING
A SINGLE PRINTING PLATE

Filed June 19, 1963

INVENTOR:
LESLIE HOWARD LORBER

BY Peter L. Tailer

ATTORNEY

United States Patent Office 3,429,702
Patented Feb. 25, 1969

3,429,702

PROCESS OF PRODUCING MULTICOLOR UTILIZING A SINGLE PRINTING PLATE

Leslie Howard Lorber, New York, N.Y., assignor of one-third interest to Bernard Olcott, New York, N.Y.

Filed June 19, 1963, Ser. No. 289,119
U.S. Cl. 96—30 20 Claims
Int. Cl. G03f *1/00;* G03c *7/00*

ABSTRACT OF THE DISCLOSURE

Producing an apparently natural multicolor picture by: forming fields of color, e.g., red, into a pattern upon a receiving surface of another color, e.g., white paper; forming a positive "long record" image on first areas of a printing plate which areas are patterned to register with the fields of color, and forming a positive "short record" image on second areas of the printing plate which areas are patterned to register with spaces of the receiving surface between the fields of color; inking the printing plate with ink, e.g., black, and transferring the two ink images on the plate to the receiving surface and fields of color thereon, so that the image on first areas is registered with fields of color while the image on second areas is registered with spaces of receiving surface between the fields of color.

This invention relates in general to colored reproductions and, more particularly, to a new type of printed color reproduction and a process for producing this new type of color reproduction.

In the May 1959 issue of Scientific American, Dr. Edwin H. Land describes a series of unusual color experiments. Classical color theory postulates three primary additive colors, red, green and blue, from which any other color sensation can be produced when these colors are mixed by projecting one color upon another. Dr. Land discovered that a broad gamut of natural color can be perceived by photographing a scene through a filter which tends to pass only longer wave lengths of light to produce a "long record" on a black and white film; and photographing the same scene through a filter which tends to only pass short wave lengths of light to produce a "short record" on black and white film; then projecting images from black and white positives of these film records in additive superposition on a screen, the long record being projected by light of a longer dominant or specific wave length than the light source projecting the short record.

Thus Dr. Land, in practice, photographed a scene through a red filter to produce a long record and a green filter to produce a short record. In projecting his images, he used a white light to project his positive short record and a red light to project his positive long record. When only the white and red lights were projected on a screen, it showed an expected pink color. However, when his long and short record black and white transparencies were dropped into place, a full color image suddenly appeared.

With this invention, I have provided a new and unobvious means to provide for the printing of colored pictures having a relatively full range of perceived color by only printing one color and a black on a piece of paper or its equivalent.

It is, therefore, a main object of this invention to provide a picture on white or tinted paper having but one color and black printed on the paper, the print giving the sensation of multicolor.

Another object of this invention is to provide a color print on which a black ink is printed upon a suitably prepared or specially manufactured paper, which print gives the sensation of multicolor.

Yet another object of this invention is to permit significant economies in the printing of multicolor pictures.

Still another object of this invention is to provide a printed picture or the like having juxtaposed long and short record image portions, one of the record image portions being printed in register with and over colored portions of a paper.

Many other objects, advantages and features of invention reside in the combination and arrangement of parts involved in this invention and its practice otherwise as will be understood from the following description and accompanying drawing wherein.

Figures 1, 2, 3:
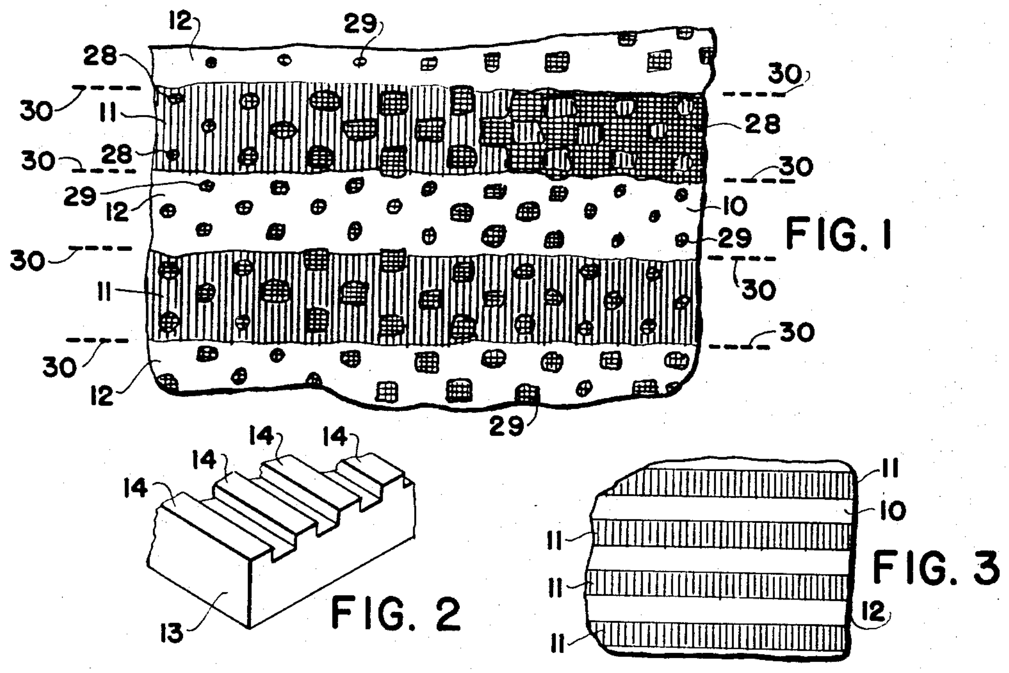
FIGURE 1 is a plan view of a greatly enlarged fragment of a color print made according to this invention.
FIGURE 2 is a perspective view of a fragment of a corner of a relief field plate.
FIGURE 3 is a plan view of a fragment of a piece of paper printed upon by the color field plate of FIGURE 2.

Referring to the drawing in detail, FIGURE 1 shows a small fragment of a printed color picture according to one illustrated embodiment of this invention. A piece of paper 10 has printed on it a number of closely spaced color fields 11. The color fields 11, as shown in FIGURE 3, are best printed in parallel rows, which may be oriented in any direction on the paper 10, with the spaces 12 between the rows 11 shown as being of the same width as the rows 11. FIGURE 2 shows a relief color field plate 13 having raised linear portions 14 which receive ink to print the strips 11 of the color field on paper 10. Color fields 11 are, in this example, printed with a red ink which reflects light having a longer wave length than the average wave length of the light reflected from a paper 10. As will become more evident in the following description, the color fields 11 do not, in themselves, contain any pictorial information.

Figure 5:
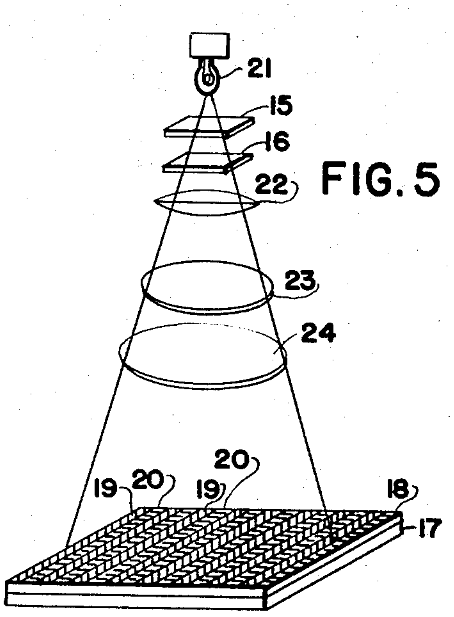
FIGURE 5 is a schematic drawing in perspective of the apparatus used to make a plate maker's image which, in turn, is used to make a plate from which the composite record image of this invention is printed.

Referring now to FIGURE 5, the picture to be printed is photographed through a red and a green filter to provide a long and a short record on black and white film transparencies 15 and 16. A plate maker's negative 17, which may be auto screen film with a fine pattern, has a specially prepared mask 18 placed upon it. The mask 18 consists of alternate strips of material 19 and 20 which may be strips of a polarizing material, each of which tends to pass light polarized in a given plane. Thus the strips 19 pass light polarized in one plane and the strips 20 pass light polarized in a substantially opposite plane.

First, the short record transparency 16 is projected by means of a suitable light source 21 and a lens system 22 through a polarizing element 23 onto the plate maker's negative 17 through the mask 18. Element 23 orients waves of light so that they are blocked by the elements 19 and only pass through the mask elements 20. Thus only the short record projected through transparency 16 is printed in strips disposed below the elements 20 on the negative 17. The short record transparency 16 and polarizer 23 are removed and the long record transparency 15 and polarizer 24 are substituted. Then transparency 15 is projected on the negative 17. Element 24 will orient light waves projected through the long record transparency 15 to pass through the strips 19 and be blocked by the strips 20. Thus the long record image and the short record image are composited on negative 17 in juxtaposed interlaced strips.

Figures 6, 7:
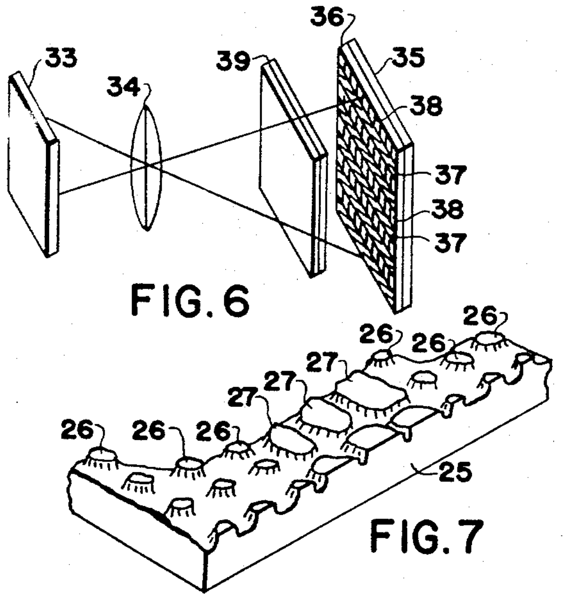
FIGURE 6 is a schematic drawing in perspective of another apparatus with which a plate maker's image may be made according to this invention.
FIGURE 7 is a perspective view of a fragment of a plate which prints the composite record image of this invention.

As shown in FIGURE 7, the negative 17 is used to make a relief printing plate 25 which has the raised ink receiving projections 26 and 27 on its surface. The projections 26 receive ink to print the long record image portions and the raised projections 27 receive ink to print the short record image portions.

Referring again to FIGURE 1, the plate 25 is printed on the paper 10 with the long record relief projetcions 26 printing the long record halftone dots 28 over the color fields 11 and with the short record relief projections 27 printing the halftone dots 29 in the spaces 12 between the color fields 11. As may be seen in FIGURE 1, individual dots or printed portions 28 and 29 may overlap the theoretical boundries, designated by the broken lines 30, of the juxtaposed printed long and short record images 28 and 29 and the coincident color fields 11 and the intervening spaces 12.

For best results on a printed page, a large number of lines of printed long and short record image portions superimposed over the color fields 11 and the spaces 12 should be provided to minimize the resolution of individual dots or printed portions 28 and 29 and the individual color fields 11. Thus it is desirable, in a magazine or a book, to provide over 100 color field strips 11 per inch each having a long record image portion printed over it in register with a short record image portion printed between the color fields.

Referring again to FIGURE 5, it is obvious that the mask 18 has the strips 19 and 20 greatly exaggerated in width. There must be enough strips 19 and 20 provided so that the final printing plate 25 will have enough rows of long and short record relief projections. Naturally, when a poster or other large color print is made, fewer lines per inch of the color fields and long and short records are needed.

When a complete color picture is printed according to this invention as shown in FIGURE 1, the observer does not perceive only a combination of red and black on white paper, but perceives a full range of color as he looks at the juxtaposed long and short records. The observer sees a range of color because the printed juxtaposed long and short records of my invention give rise to a phenomenon similar to that reported by Dr. Land.

FIGURE 6 shows another apparatus which may be used to produce a plate maker's negative having thereon juxtaposed long and short record image portions. The copy 33 is photographed through a suitable lens system 34 onto a plate maker's negative 35. Disposed in front of the negative 35 is a mask 36 which consists of strips of color filter elements 37 and 38. The filter elements 37 may be green and the filter elements 38 may be red and the filter elements 37 and 38 should pass substantially mutually exclusive wavelengths. Thus the negative 35 has a long record image printed beneath the red filter elements 38 and a short record image printed beneath the green filter elements 37. A halftone screen 39 may be disposed a suitable distance in front of the mask element 36 and the film 35. If the negative 35 is exposed through a mask 36 having appropriately spaced filter elements 37 and 38, a plate 25 may be made from the negative 35 and printed on a piece of paper 10 with the long and short record images in register with the color fields 11 and the spaces 12. If it is desired, the negative 35 may be enlarged or reduced so that a resulting plate 25 may be printed in register on the color fields.

Figure 4:
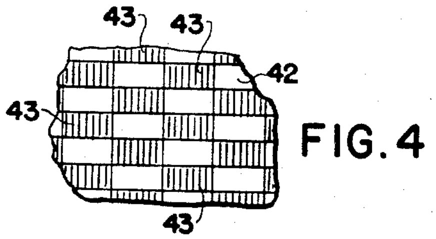
FIGURE 4 is a plan view of an alternative color field pattern printed upon a fragment of a piece of paper.

While the color fields 11 have been shown as being strips having spaces of equal width between them, any color field pattern may be used provided the long record image pattern is printed in register with it. If desired, the color fields may be wider or narrower than the intervening spaces, the color fields may be formed in waves or swirl patterns, or in any other suitable manner. As shown in FIGURE 4, a piece of paper 42 has the color field blocks 43 printed on it. If such a color field pattern is used, the masks 18 or 36 must then have a corresponding pattern so that the long record image portions may be printed over the color field blocks 43.

It has been pointed out that the color fields do not, in themselves, contain pictorial information. Thus it is not necessary in the practice of this invention to use a color field printer as shown in FIGURE 2 or its planographic or gravure equivalents. While color fields normally should only cover the area of a picture, they may extend beyond the picture area and cover the entire paper including those parts which may contain type matter. Thus, if desired, a printer or publisher may use paper which has been prepared with color fields by any suitable means at a paper mill or by a paper finisher or by another printer. However, the long and short record images on the plate 25 or any other equivalent and conventional printing means must register with the color fields and spaces of the prepared paper.

While the color fields have been described as being printed or formed in a red ink on a white paper, other combinations of paper color and field color may be used. For example, a white or "cool" tint ink may be printed on a red paper. If the color fields are printed, they should preferably be printed with a highly chromatic red or red orange ink, but paler and less correct multicolor effects will result with yellow, yellow orange, and other colored inks generally in the upper or "red" end of the spectrum. The color fields preferably reflect light of an average longer wave length than that of the light reflected from the paper 10. The color fields may be printed over the long or short record images.

It would appear that somewhat less brilliant color effects are possible by printing color fields in a color from the lower or middle or generally "green" portion of the spectrum. When a "green" color field is printed on a white paper, the short record image portions are printed in register with the green color fields rather than the spaces therebetween.

It is also possible that there are special cases wherein the required spectral difference between the long and short record images printed on and between color fields are psychologically induced, as when a white paper, which appears to be a warm color generally complementary to a green, has color fields printed thereon in the green. While the white paper and the green color fields may reflect light of substantially the same average wave length, the white paper will appear to be a warm color relative to the green due to the phenomenon of "simultaneous contrast." Thus this invention is not limited to any particular color of paper or color field formed or printed thereon although certain particular color combinations give rise to superior results.

The colors perceived in pictures made by means of this invention have surprising stability in the spectra of illuminants with which printed matter is commonly viewed. While the color fields and the intervening spaces over which the long and short record image portions are printed have been shown in FIGURE 1 as extending up to each other, a slight unprinted space may be left between the long and short record image portions to minimize any distortions caused by a slight mis-register of the long and short record image portions on and between the color fields. Further, it is generally desirable that a halftone screen size be selected which will print three or more rows of dots across the width of each color field or intervening space.

While this invention has been shown and described as it might be applied to letterpress, anyone skilled in the printing arts could readily apply it to any other known printing technique, such as offset lithography, gravure, xerography, and the like.

While I have shown and described my invention in one of the specific forms known to me, it will nevertheless be understood that this is purely exemplary and that modifications in the procedure, arrangement and combination of parts and the substitution of materials and known processes may be made without departing from the spirit of the invention except as it may be more limited in the appended claims.

I claim:

1. The process of producing an apparent multicolor print, comprising the steps of: forming spaced color fields of a preselected color on a receiving surface of a different color; placing a mask over a photosensitive emulsion, said mask having first and second mask areas corresponding respectively to said color fields and spaces therebetween, said first and second areas having different light transmitting properties; transmitting a long record image onto said emulsion by light which passes through said first mask areas and is attenuated by said second mask areas; transmitting a short record image onto said emulsion by light which passes through said second mask areas and is attenuated by said first mask areas; processing said emulsion; making a single positive printing plate corresponding to said processed emulsion and having first and second plate areas corresponding to said color fields and spaces of said receiving surface between said color fields, respectively; inking the entire transfer area of said printing plate with a single ink; and transferring the ink images on said plate by a single pressing to said receiving surface and spaced color fields thereon, so that the ink image within said first plate areas registers with the color fields and the ink image within said second plate areas registers with spaces of the receiving surface between the color fields.

2. The process according to claim 1 wherein said spaced color fields are red.

3. Process according to claim 1 wherein the color of said receiving surface is white.

4. Process according to claim 1 wherein said receiving surface is cool tinted in color.

5. Process according to claim 1 wherein said single ink is black.

6. Process according to claim 1 wherein said first and second mask areas have substantially opposite light polarizing properties, and substantially opposite polarized light is employed to transmit said long record image and said short record image, respectively, onto said emulsion.

7. Process according to claim 1 wherein said first and second mask areas have different and substantially mutually exclusive wavelength transmission properties.

8. Process according to claim 1 wherein both the long record image and the short record image are transmitted simultaneously onto said emulsion.

9. Process according to claim 1 wherein said first mask areas are transparent red and said second mask areas are transparent green.

10. Process according to claim 1 wherein said first mentioned step of forming spaced color fields is performed last and after said ink images transferring step transfers both the long record and short record ink images to said receiving surface, said color fields being formed in register with the areas occupied by said long record ink image.

11. The process of producing an apparent multicolor print, comprising the steps of: forming spaced color fields of a preselected color on a receiving surface of a different color; placing a mask over a photosensitive emulsion, said mask having first and second mask areas corresponding respectively to said color fields and spaces therebetween, said first and second areas having different light transmitting properties; transmitting a short record image onto said emulsion by light which passes through said first mask areas and is attenuated by said second mask areas; transmitting a long record image onto said emulsion by light which passes through said second mask areas and is attenuated by said first mask areas; processing said emulsion; making a single positive printing plate corresponding to said processed emulsion and having first and second plate areas corresponding to said color fields and spaces of said receiving surface between said color fields, respectively; inking the entire transfer area of said printing plate with a single ink; and transferring the ink images on said plate by a single pressing to said receiving surface and spaced color fields thereon, so that the ink image within said first plate areas registers with the color fields and the ink image within said second plate areas registers with spaces of the receiving surface between the color fields.

12. Process according to claim 11 wherein said spaced color fields are green.

13. Process according to claim 11 wherein the color of said receiving surface is white.

14. Process according to claim 11 wherein said receiving surface is warm tinted in color.

15. Process according to claim 11 wherein said single ink is black.

16. Process according to claim 11 wherein said first and second mask areas have substantially opposite light polarizing properties, and substantially opposite polarized light is employed to transmit said short record image and said long record image, respectively, onto said emulsion.

17. Process according to claim 11 wherein said first and second mask areas have different and substantially mutually exclusive wavelength transmission properties.

18. Process according to claim 11 wherein both the short record image and the long record image are transmitted simultaneously onto said emulsion.

19. Process according to claim 11 wherein said first mask areas are transparent green and said second mask areas are transparent red.

20. Process according to claim 11 wherein said first mentioned step of forming spaced color fields is performed last and after said ink images transferring step transfers both the short record and long record ink images to said receiving surface, said color fields being formed in register with the areas occupied by said short record ink image.

References Cited

UNITED STATES PATENTS

| | | | |
|---|---|---|---|
| 3,147,699 | 9/1964 | Land | 96—30 |
| 2,618,554 | 11/1952 | Zieger et al. | 96—45 |
| 2,711,031 | 6/1955 | Kessler | 96—27 |
| 3,003,391 | 10/1961 | Land | 96—24 |

J. TRAVIS BROWN, *Primary Examiner.*

U.S. Cl. X.R.

96—24; 101—211